Nov. 3, 1970  R. D. WAITE ET AL  3,537,322
GAUGE BEZEL
Filed Feb. 28, 1968
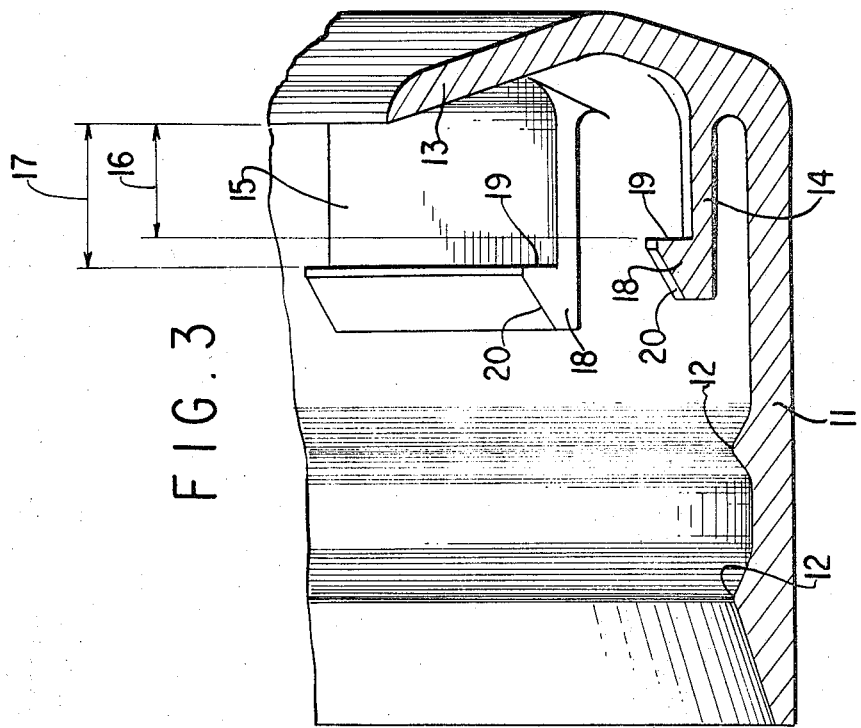
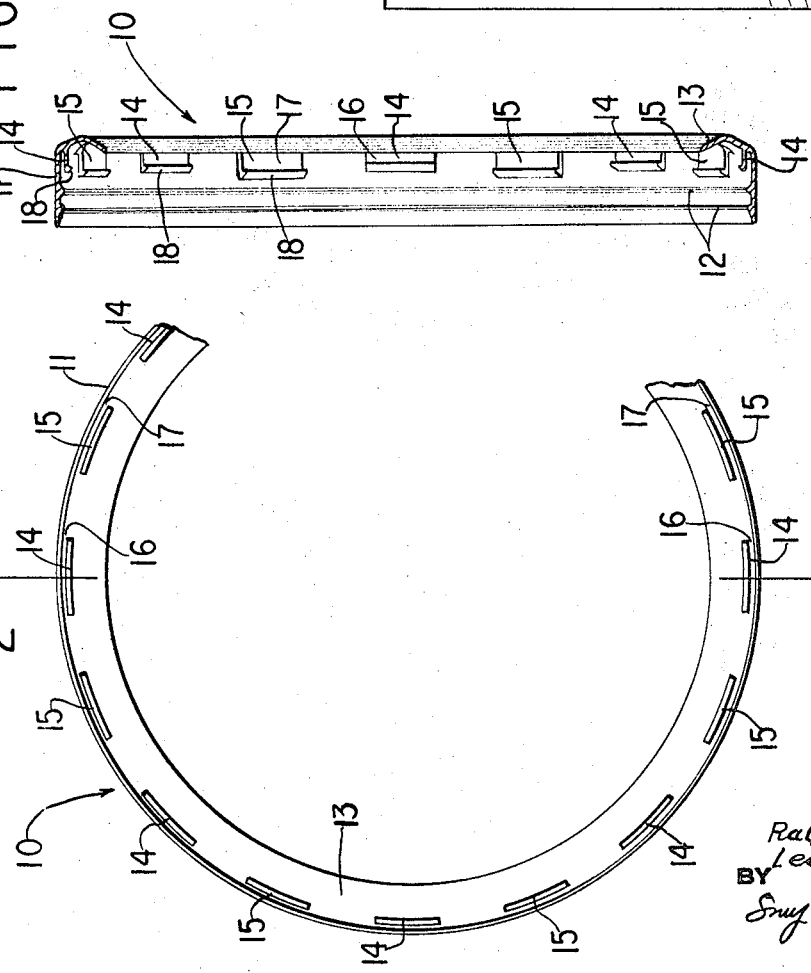
INVENTORS
Ralph D. Waite
Leonard J. Bohenek
BY
Smythe & Moore
ATTORNEYS

3,537,322
GAUGE BEZEL
Ralph D. Waite, Sellersville, and Leonard J. Bohenek, Northampton, Pa., assignors to Ametek, Inc., New York, N.Y., a corporation of Delaware
Filed Feb. 28, 1968, Ser. No. 708,991
Int. Cl. G01d *11/26*
U.S. Cl. 73—431          1 Claim

ABSTRACT OF THE DISCLOSURE

A plastic bezel for instrument gauges and the like in which a plurality of flexible lips extend downwardly from the rim portion of the bezel in spaced relation to the skirt portion of the bezel and carry lens retaining projections. Alternate lips and projections may be differently spaced from the rim portion to accommodate and support lenses of different thicknesses, and are resiliently retractable into the spaces between the lips and skirt.

---

This invention relates to bezels or retaining rings for the lens or transparent closure of an instrument gauge or the like and more particularly to a plastic bezel for accommodating transparent closures of different thicknesses.

Removable transparent closures for instrument gauges and the like are well known in the gauge art, such being shown, for example, in U.S. Pats. 3,187,582 and 3,205,712. In these patents and other known devices of the prior art, however, a continuous groove or bead serves to support and retain the lens or similar transparent member in the bezel.

An object of the present invention is to provide a new and improved means for retaining a lens or similar transparent closure member in a plastic bezel for instrument gauge casings and the like.

Another object is to provide a bezel for instrument gauges which is particularly adapted for accommodating and retaining lenses of different thicknesses.

A further object is the provision of a bezel in which retainers for a lens of one thickness are readily moved out of the way for a lens of different thickness.

A still further object is the provision of an instrument gauge bezel in which a plurality of alternately arranged projections with separate flexible lips provide for retaining lenses of different thicknesses.

In one aspect of the invention, the bezel or retaining ring comprises an annular skirt member adapted to engage the wall of an instrument gauge casing or the like and an inturned rim or flange adapted to engage the outer surface of a lens or similar transparent medium. Attached to the underside of the rim in radially spaced relation to the skirt member are a plurality of spaced flexible lips, each having a lens retaining projection formed thereon. These spaced lips are of different lengths and are alternately arranged and differently spaced from the rim member, to accommodate lenses of different thicknesses.

The above and other objects, features and advantages of the invention will be apparent from the following description taken in conjunction with the attached drawings which illustrate an exemplary embodiment of the invention.

In the drawings:
FIG. 1 is a plan view of the bezel of the invention;

FIG. 2 is a sectional view of the bezel shown in FIG. 1 taken along the line 2—2 of FIG. 1; and
FIG. 3 is a partially enlarged sectional view of FIG. 2.

Referring to the drawings, there is shown a bezel or lens retaining ring 10 having an annular skirt portion 11 adapted to fit over or within the outer peripheral wall of an instrument gauge casing or the like. The bezel 10 is preferably constructed from a suitable form of plastic material, such as polypropylene, which combines strength with flexibility. Extending inwardly of the skirt 11 is a flange or rim 13 which is preferably curved or arched, as shown in FIGS. 2 and 3, flexibly to engage the outer surface of a lens or similar transparent closure member. A plurality of beads or ribs 12 may also be formed on the skirt portion 11 to assist in removably securing the bezel to the gauge casing.

Attached to the rim 13 and extending downwardly within the skirt portion 11 are a plurality of concentrically arranged flexible lips 14 and 15 so displaced radially from the skirt 11 to permit flexure thereof relative to the skirt. Each of the lips 14 and 15 carries an inwardly extending projection 18 providing a seat 19 for receiving and retaining a lens or similar transparent closure for the gauge casing. As best shown in FIGS. 2 and 3, however, the length of the alternately arranged lips 14 is less than that of the lips 15 whereby the projections 18 and lens retaining seats 19 are arranged at different distances 16 and 17, respectively from the rim 13 thereby to accommodate lenses of different thicknesses. Since the lips 14 and 15 are alternately arranged with the former being shorter in length then the latter, it will be apparent that a lens of moderate thickness may be angularly inserted between the lip projections 18 and the rim 13 and readily snapped into the bezel, during which the projections and lips will be flexed outwardly or laterally until the annulus of the glass clears or passes the projections and the underside of the glass flatly engages and is supported by the projections on the shorter lips 14. On the other hand, when a lens of greater thickness is to be assembled, the glass will be similarly inserted between the projections on the longer lips 15 and the rim, during which both lips 14 and 15 are laterally flexed to permit passage of the glass thereby. Thus, after the glass is snapped thereinto, the underside thereof will correspondingly be supported by the projections 18 on the longer lips 15, and the annulus of the glass will flex the shorter lips laterally relative to the skirt 11. It will, of course, be apparent that glasses of varying thickness may be readily interchangeably assembled in the bezel. To facilitate insertion of the lens, the projections 18 may be provided with inclined or sloping surfaces 20 as best shown in FIG. 3. As also shown in FIGS. 1 and 2, the lips 14 and 15 and the projections 18 carried thereby are alternately arranged relative to one another, there being eight equally spaced lips 14 and eight alternately spaced lips 15 in the illustrated embodiment.

It should be apparent that details of construction can be varied without departing from the spirit of the invention except as set forth in the appended claim.

What is claimed is:
1. In a plastic bezel for instrument gauges, a lens retaining ring comprising a skirt portion and an inwardly extending rim portion, a plurality of depending annularly spaced flexible lip members attached to said rim portion and spaced radially inwardly of said skirt portion to provide a space between the lip members and the skirt por- tion to accommodate said members when flexed laterally, and a lens retaining projection carried by each of said lip members, alternate lip members being of the same length and varying from the length of the other lip members whereby relatively thick lens may be supported by the longer lip members and less thick lens may be supported by the shorter lip members when the longer lip members are flexed laterally.

References Cited

UNITED STATES PATENTS

| | | | |
|---|---|---|---|
| 3,162,173 | 12/1964 | Morgan et al. | 116—129 |
| 2,346,495 | 4/1944 | Lingel | 73—431 |
| 3,187,582 | 6/1965 | Perkins et al. | 73—431 |
| 3,205,712 | 9/1965 | Hoff | 73—431 |
| 3,320,922 | 5/1967 | Taylor et al. | 116—118 |

LOUIS R. PRINCE, Primary Examiner

D. M. YASICH, Assistant Examiner

U.S. Cl. X.R.

116—129; 215—41

UNITED STATES PATENT OFFICE
CERTIFICATE OF CORRECTION

Patent No. 3,537,322     Dated November 3, 1970

Inventor(s) Ralph D. Waite and Leonard J. Bohenek

It is certified that error appears in the above-identified patent and that said Letters Patent are hereby corrected as shown below:

Column 2, line 26, insert "similarly alternately arranged" before "lips 15".

SIGNED AND
SEALED
FEB 2 1971

(SEAL)
Attest:

Edward M. Fletcher, Jr.
Attesting Officer

WILLIAM E. SCHUYLER, JR.
Commissioner of Patents